United States Patent [19]
Ament et al.

[11] Patent Number: 5,431,269
[45] Date of Patent: Jul. 11, 1995

[54] TRANSMISSION FOR A MOTOR VEHICLE WITH A FRICTION CLUTCH HAVING A CLUTCH DISC WITH TORSIONALLY LOCKED FRICTION RING

[75] Inventors: Norbert Ament, Eltingshausen; Harald Raab, Schweinfurt, both of Germany

[73] Assignee: Fichtel & Sachs AG, Schweinfurt, Germany

[21] Appl. No.: 163,336

[22] Filed: Dec. 6, 1993

[30] Foreign Application Priority Data

Dec. 8, 1992 [DE] Germany .................. 42 41 280.3

[51] Int. Cl.⁶ .................. F16D 3/66; F16D 13/64
[52] U.S. Cl. .................................. 192/106.2
[58] Field of Search .............. 192/106.2; 464/68

[56] References Cited

U.S. PATENT DOCUMENTS

| | | |
|---|---|---|
| 3,861,764 | 1/1975 | Adams . |
| 4,433,771 | 2/1984 | Caray . |
| 4,453,838 | 6/1984 | Loizeau . |
| 4,520,916 | 6/1985 | Strub . |
| 4,635,780 | 1/1987 | Wiggen . |
| 4,640,398 | 2/1987 | Kolb et al. . |
| 4,651,857 | 3/1987 | Schraut et al. . |
| 4,667,801 | 5/1987 | Fischer et al. . |
| 4,684,007 | 8/1987 | Maucher . |
| 4,697,682 | 10/1987 | Alas et al. . |
| 4,700,822 | 10/1987 | Maucher et al. .......... 192/106.2 |
| 4,763,767 | 8/1988 | Lanzarini et al. . |
| 4,890,712 | 1/1990 | Maucher et al. .......... 192/106.2 |
| 5,016,744 | 5/1991 | Fischer et al. . |
| 5,117,959 | 6/1992 | Graton ...................... 192/106.2 |
| 5,169,357 | 12/1992 | Graton ...................... 192/106.2 X |
| 5,217,409 | 6/1993 | Dalbiez ...................... 192/106.2 X |

FOREIGN PATENT DOCUMENTS

| | | |
|---|---|---|
| 0488859 | 6/1992 | European Pat. Off. . |
| 0075138 | 4/1987 | Japan ........................ 192/106.2 |
| 2080488 | 2/1982 | United Kingdom . |
| 2193788 | 2/1988 | United Kingdom ...... 192/106.2 |
| 2231124 | 11/1990 | United Kingdom . |

Primary Examiner—Rodney H. Bonck
Attorney, Agent, or Firm—Nils H. Ljungman & Associates

[57] ABSTRACT

A clutch disc with a basic friction device, which can have a corresponding friction ring with axial projections that torsionally lock with the toothing of the hub, for transmission of the torque to the hub disc.

20 Claims, 6 Drawing Sheets

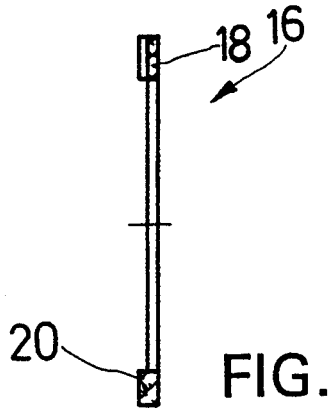
FIG. 2
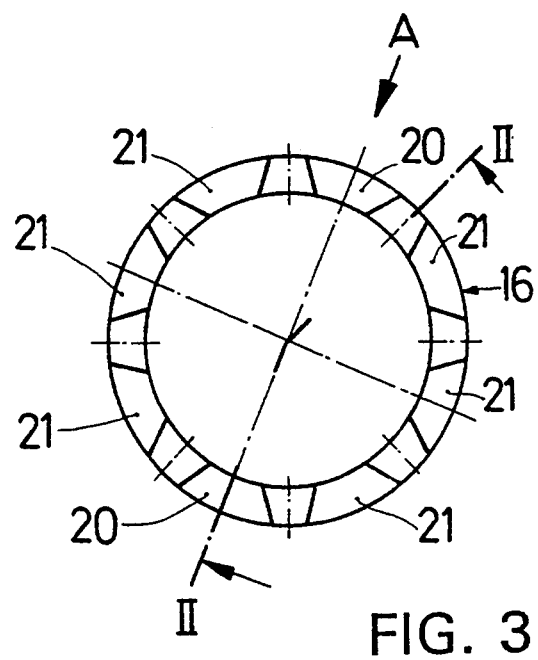
FIG. 3
FIG. 4
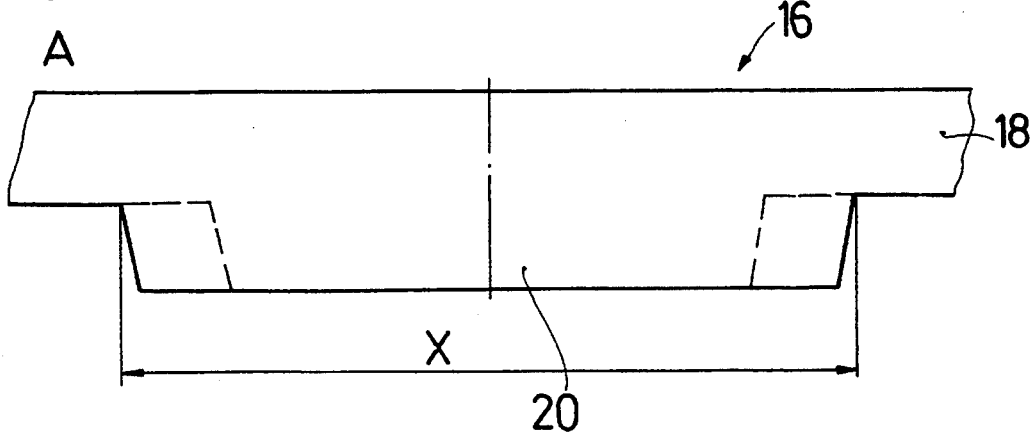
FIG. 5
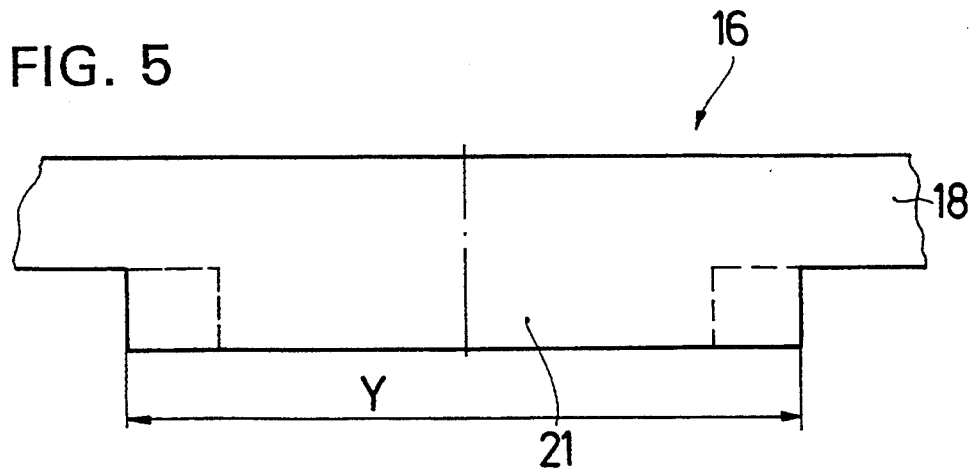

TRANSMISSION FOR A MOTOR VEHICLE WITH A FRICTION CLUTCH HAVING A CLUTCH DISC WITH TORSIONALLY LOCKED FRICTION RING

BACKGROUND OF THE INVENTION

1. Field of the Invention

This invention relates generally to friction clutches and more particularly to friction clutch discs.

2. Background Information

German Laid Open Patent Application No. 3 921 283, which corresponds to U.S. Pat. No. 5,016,744 entitled "Clutch Disc for a Friction Clutch", discloses such a clutch disc. On that clutch disc, there is a basic friction device, which is located between the end surface of the hub toothing and the one cover plate. It consists of a friction ring which is in direct contact with the toothing, and a lock washer between the friction ring and the cover plate.

Basic friction devices of this type are tuned so that they generate the friction force in the idle range. But the range of fluctuation for the friction force generated by such a configuration is too great for particularly difficult tunings. With such a design, it cannot be guaranteed that the same friction surface will always act to apply the friction. In particular, it is easily possible for the friction surface to change, namely from the toothing of the hub to the friction ring, from the friction ring to the spring, or from the spring to the cover plate. Even if the coefficient of friction of the friction ring in relation to steel is lower than the coefficient of friction for steel-on-steel, if there is any surface roughness, the friction surfaces can occur between the lock washer and the cover plate, at least temporarily.

The change of the friction surface, which occurs in known clutch assemblies has a very significant disruptive effect on idle tuning in sensitive vehicles.

OBJECT OF THE INVENTION

The object of the present invention is therefore to eliminate the disadvantages of known clutch assemblies at a reasonable expense.

SUMMARY OF THE INVENTION

The invention teaches that this object can be achieved by means of characteristics discussed hereinbelow wherein a torsional locking of the friction ring and hub is provided. As a result of the torsional locking of the friction ring in relation to the hub, it can be stated from the outset that the friction surfaces used must lie either between the friction ring and the spring or between the spring and the cover plate. It can also be assumed that when the surfaces of the friction ring, spring and cover plate are correctly manufactured, the friction surface will be between the friction ring and the spring, because that is where the lower coefficient of friction is. At least after the break-in or run-in process, at this point of separation, it is guaranteed that the friction surface used will be between the friction ring and the spring, since the friction ring essentially cannot move in relation to the hub due to the torsional locking. It is particularly advantageous to also use the toothing which is already present on the hub for the torsional locking of the friction ring. For this purpose the friction ring can have at least one axial projection distributed at the circumference of the friction ring to absorb the torque, and avoid the problem of pitch error.

The invention also teaches that the contour of the first projections can be essentially the same as the contour of the toothing. In this manner, it can essentially be guaranteed that the surface pressure during the generation of the moment of friction is reduced to a minimum.

It has also proven very advantageous if the first projections preferably run conically in the axial direction, namely becoming narrower as they project away from the base body of the friction ring. A very simple installation process is thereby possible, since the conical projections can be more easily threaded into the toothing of the hub. In the vicinity of the base body, from which the projections extend, the projections can be designed to be fully stress-bearing in relation to the toothing of the hub, so that preferably no clearance or play can occur in the circumferential direction.

In accordance with an additional characteristic feature of the invention, there can be second axial projections distributed over the circumference of the friction ring, which second axial projections have a smaller circumferential dimension than the gaps in the external toothing. These additional projections do not cause interference during the assembly process, and as a result of their special configuration, they cannot cause problems as a result of pitch errors. They are used only to protect against relative torsional displacement in relation to the hub, in the event of wear of the first axial projections.

The manufacturing tolerances of the second projections can therefore be relatively large, at least in the circumferential direction.

An additional simplification of the basic friction device can be achieved by making the friction ring with its base body, in circumferential areas adjacent the first axial projections, corrugated in the axial direction, so that the addition of a spring is unnecessary. Such a configuration has the advantage of a smaller number of components, easier assembly and the guarantee of a constant basic friction, since it is guaranteed that the friction surface will always be between the axially corrugated areas of the friction ring and the cover plate.

The base body, on the circumference between the projections, is thereby provided with corrugated crests which project in the opposite axial direction from the projections and have a flat surface area. The addition of the flat surface area can essentially guarantee that the surface pressure of the contact between the corrugated crests and the cover plate will not drop below a specified value.

In one embodiment of the clutch disc, the invention proposes that a first hub disc for the idle spring device be fastened on one side of the external toothing of the hub, and that the guide element of the cover plate corresponding to the first hub disc is in contact with the first hub disc by means of an axially oriented leg. The axially spring mounted friction ring is preferably located on the opposite side between the cover plate and the end surface of the toothing, and the second hub disc is located between the friction ring and the first hub disc of the idle spring device. In this embodiment, the base friction is generated both by means of the friction ring and by means of the axially-oriented leg of the guide element on the opposite side, whereby both of the components participating in the generation of the friction force are locked to another component by means of a positive fit. Thus the friction surfaces are clearly defined, and the basic friction can be precisely tuned. Moreover, the toothing already present on the hub can also be used for the torsional locking of the friction ring, namely in the area in which the hub toothing it is not occupied by the toothing of the second hub disc. Thus there is a particularly simple basic friction device for clutch discs of this type, the effect of which can be regulated with precision. This orientation in the axial direction also conserves a great deal of space.

One aspect of the invention resides broadly in a friction clutch for a transmission, in particular a transmission for a motor vehicle, the friction clutch comprising a clutch disc, the clutch disc comprising: a hub; the hub defining an axis of rotation; the hub comprising a hub disc disposed concentrically about the hub; the hub disc comprising a first side and a second side; a first cover plate disposed at the first side of the hub disc; the first cover plate comprising a plurality of windows disposed within the first cover plate; a second cover plate disposed at the second side of the hub disc; the second cover plate comprising a plurality of windows disposed within the second cover plate; the hub being configured to be torsionally locked on a drive shaft; the hub disc comprising a plurality of windows disposed within the hub disc; ones of the plurality of windows of the first cover plate, the second cover plate, and the hub disc being aligned with one another; a plurality of spring actuators disposed within the ones of the plurality of windows of the first cover plate, the second cover plate, and the hub disc; friction linings; the friction linings being disposed on one of the first cover plate and the second cover plate; a guide element being disposed between the first cover plate and the hub to serve as an axial stop for positioning the first cover plate in relation to the hub; the hub comprising a plurality of teeth extending radially outward from the hub; a plurality of spaces being disposed between and defined by ones of the plurality of teeth of the hub; the hub disc comprising a plurality of teeth extending radially inward from the hub disc; a plurality of spaces being disposed between and defined by ones of the plurality of teeth of the hub disc; ones of the plurality of teeth of the hub disc being engaged between ones of the plurality of teeth of the hub in ones of the plurality of spaces between ones of the plurality of teeth of the hub; friction means being disposed along the second cover plate; the friction means for providing a friction surface adjacent the hub; the friction means comprising a friction ring; the friction ring disposed concentrically about the axis of rotation; the friction ring comprising a ring-shaped base body; the base body having an axial direction substantially parallel to the axis of rotation and a circumferential direction about the axis of rotation; at least one first axial projection being disposed along the base body; the at least one first axial projection substantially projecting in the axial direction; the at least one first axial projection being disposed substantially tightly in the circumferential direction within one of the plurality of spaces between adjacent ones of the plurality of teeth of the hub; spring means; the spring means being disposed between the second cover plate and the friction ring; and the spring means being disposed to bias the friction ring towards the teeth of the hub.

Another aspect of the invention resides broadly a transmission, in particular for a motor vehicle, a friction clutch, said friction clutch comprising a clutch disc, said clutch disc comprising: a hub; the hub defining an axis of rotation; the hub comprising a hub disc disposed concentrically about the hub; the hub disc comprising a first side and a second side; a first cover plate disposed at the first side of the hub disc; the first cover plate comprising a plurality of windows disposed within the first cover plate; a second cover plate disposed at the second side of the hub disc; the second cover plate comprising a plurality of windows disposed within the second cover plate; the hub being configured to be torsionally locked on a drive shaft; the hub disc comprising a plurality of windows disposed within the hub disc; ones of the plurality of windows of the first cover plate, the second cover plate, and the hub disc being aligned with one another; a plurality of spring actuators disposed within the ones of the plurality of windows of the first cover plate, the second cover plate, and the hub disc; friction linings; the friction linings being disposed on one of the first cover plate and the second cover plate; a guide element being disposed between the first cover plate and the hub to serve as an axis stop for positioning the first cover plate in relation to the hub; the hub comprising a plurality of teeth extending radially outward from the hub; a plurality of spaces being disposed between and defined by ones of the plurality of teeth of the hub; the hub disc comprising a plurality of teeth extending radially inward from the hub disc; a plurality of spaces being disposed between and defined by ones of the plurality of teeth of the hub disc; ones of the plurality of teeth of the hub disc being engaged between ones of the plurality of teeth of the hub in ones of the plurality of spaces between ones of the plurality of teeth of the hub; friction means being disposed along the second cover plate; the friction means for providing a friction surface adjacent the hub; the friction means comprising a friction ring; the friction ring disposed concentrically about the axis of rotation; the friction ring comprising a ring-shaped base body; the base body having an axial direction substantially parallel to the axis of rotation and a circumferential direction about the axis of rotation; at least one first axial projection being disposed along the base body; the at least one first axial projection substantially projecting in the axial direction; the at least one first axial projection being disposed substantially tightly in the circumferential direction within one of the plurality of spaces between adjacent ones of the plurality of teeth of the hub; spring means; the spring means being disposed between the second cover plate and the friction ring; and the spring means being disposed to bias the friction ring towards the teeth of the hub.

Yet another aspect of the invention resides broadly in a clutch disc for a friction clutch, the clutch disc comprising: a hub; the hub defining an axis of rotation; the hub comprising a plurality of teeth extending radially outward from the hub; a plurality of spaces disposed between and defined by ones of the plurality of teeth of the hub; a hub disc; the hub disc disposed about the hub concentrically; the hub disc comprising a plurality of teeth extending radially inward from the hub disc; ones of the plurality of teeth of the hub disc being engaged between ones of the plurality of teeth of the hub in ones of the plurality of spaces between ones of the plurality of teeth of the hub; friction means; the friction means for providing a friction surface adjacent the hub; the friction means comprising a friction ring disposed concentrically about the axis of rotation; the friction ring comprising a ring-shaped base body; the base body having an axial direction substantially parallel to the axis of rotation and a circumferential direction about the axis of rotation; at least one first axial projection disposed along the base body and substantially projecting in the axial direction; and the at least one first axial projection configured to be and being disposed substantially tightly in the circumferential direction within one of the spaces between adjacent ones of the plurality of teeth of the hub.

BRIEF DESCRIPTION OF THE DRAWINGS

The invention is explained in greater detail below with reference to the examples illustrated in the accompanying embodiments in which:

FIGS. 2 and 3 show a cross section and plan view of a friction ring;

FIGS. 4 and 5 show partial views of the examples illustrated in FIGS. 2 and 3;

DESCRIPTION OF THE PREFERRED EMBODIMENTS

Figure 1:
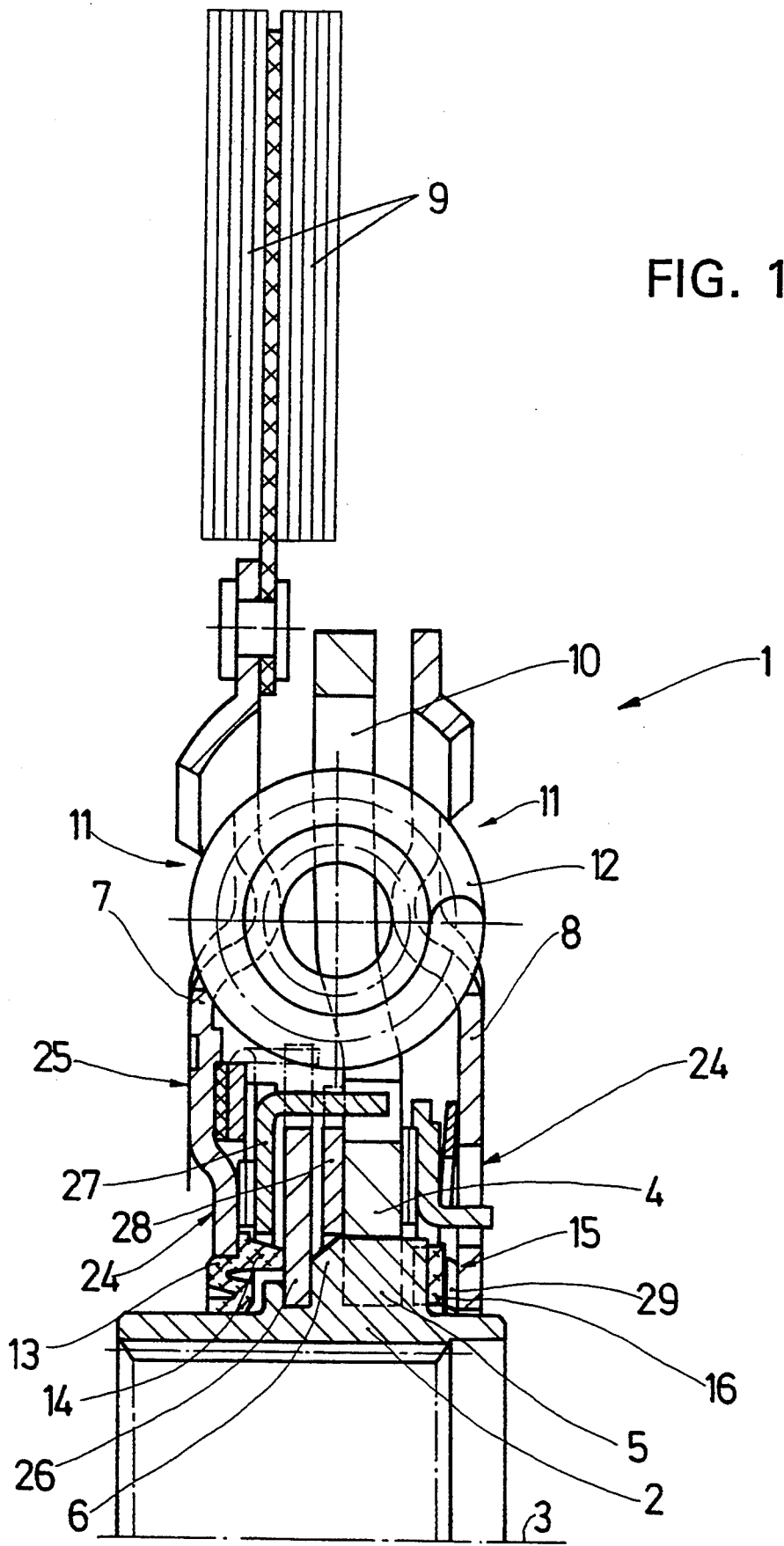
FIG. 1 shows a longitudinal section through the upper half of a clutch disc.

FIG. 1 shows a clutch disc 1 and its overall installation. The clutch disc is oriented concentrically with an axis of rotation 3, and consists of a hub 2, on which at least two cover plates 7 and 8 are radially guided, e.g. by means of a guide element 13 located on the cover plate 7. Both cover plates 7 and 8 are preferably locked together and held at a specified distance from one another (not shown), and the cover plate 7 can preferably have friction linings 9 on its radial outside. Axially between the two cover plates 7 and 8, there will generally be a hub disc 4 which points radially inward, and which can be torsionally locked in relation to the hub 2 by means of a toothing. The hub 2 preferably has an external toothing 6, and the hub disc 4 preferably has an internal toothing 5. In windows 10 of the hub disc 4 and in windows 11 of the cover plates 7 and 8, there can generally be mounted springs 12, which springs 12 are compressed when torque is transmitted by the clutch disc 1, and thus guarantee a relative torsion between the cover plates 7 and 8 with the friction linings 9 on one hand, and the hub disc 4 with the hub 2 on the other hand, to reduce the torsional oscillations. In this case, there can also preferably be an idle spring device, which consists of the hub disc 26 with the cover plates 27 and 28 located on both sides, and springs which are not shown in FIG. 1, but which are located between the hub disc 26 and the cover plates 27 and 28 in corresponding windows. One possible configuration of springs 26a and is illustrated in FIG. 1a, wherein the springs 26a are preferably located between the hub disc 26 and the cover plates 27 and 28 in corresponding windows.

The hub disc 26 is can preferably be rigidly connected to the hub 2, and the two cover plates 27 and 28 can preferably be torsionally locked to the hub disc 4. In this case of the addition of an idle spring device, it can be necessary to have some clearance or play between the hub disc 4 with its toothing 5 on the circumference and the toothing 6 on the hub 2. The idle spring device is preferably active inside this circumferential clearance. It is also possible, however, to realize the present invention on a clutch disc which does not have an idle spring device, in which case the toothings 5 and 6 would be designed without clearance on the circumference. Different friction devices can also be located in the clutch disc 1, namely a friction device for the load range, identified in the drawing by the number 24, and if necessary an additional friction device 25. These friction devices are known from the prior art, and are therefore not described here in any additional detail.

There is also a basic friction device 15, which is active both in the idle range and also in the load range, and to which special attention should be paid in terms of tuning. In this case, the friction device 15 preferably has an axially oriented leg 14 of the guide element 13 in the cover plate 7, and a friction ring 16 between the external toothing 6 of the hub 2 and the other cover plate 8, which friction ring can preferably be supported by a spring 29, e.g. in the form of a corrugated spring which is also in contact with the cover plate 8. The friction ring 16 can thereby be torsionally locked to the hub 2, in a manner which is described in greater detail below, to achieve a clear definition of the friction surface on the side of the assembly defined by cover plate 8. The spring 29 is tensioned by means of the two cover plates 8 and 7, which are preferably locked together, and by the guide element 13 on the hub disc 26 of the idle spring device, when such device is fully assembled.

Figure 1A:
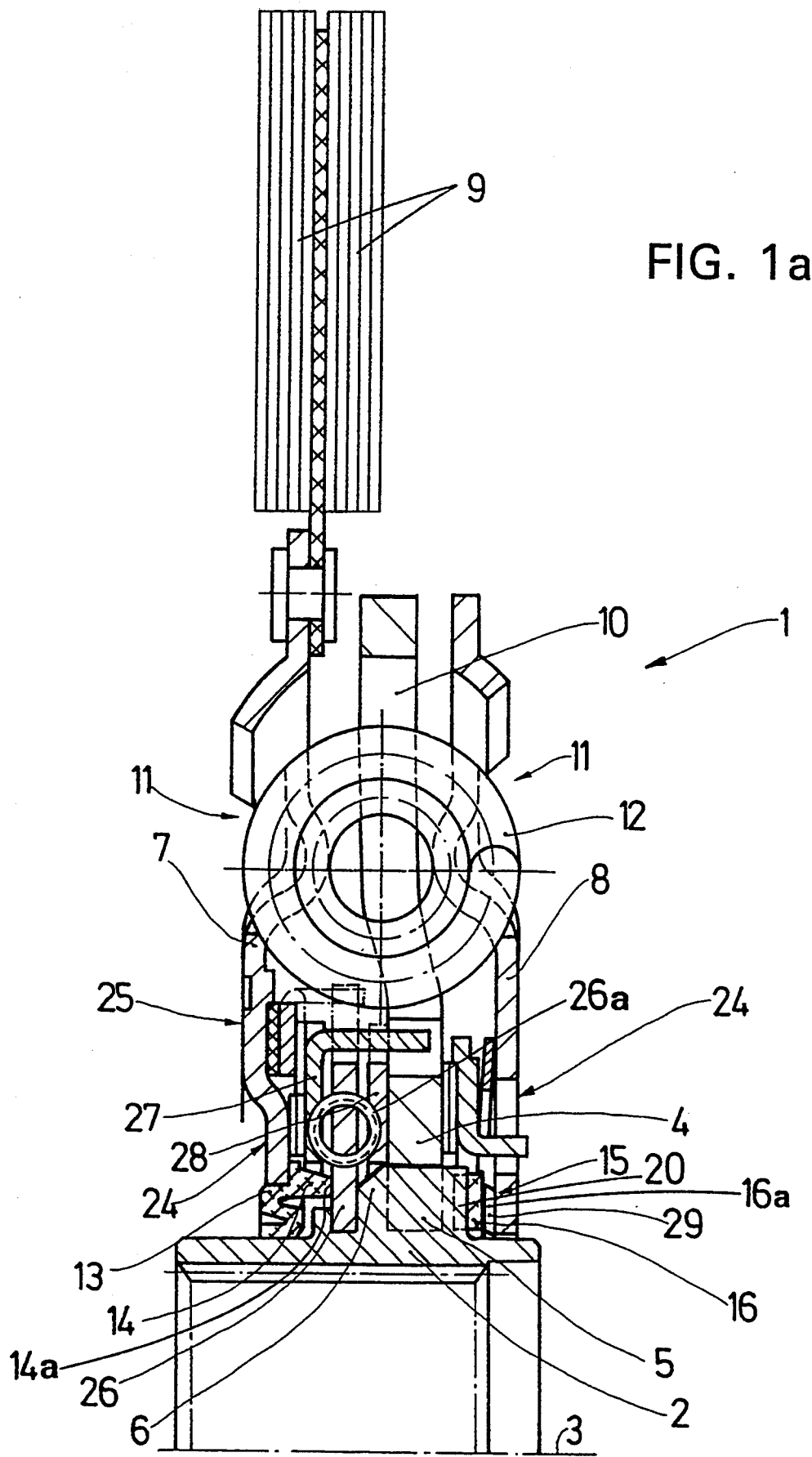
FIG. 1a is substantially the same view as FIG. 1 but shows additional components.

Further, the friction ring 16 can preferably be torsionally locked to the hub 2 in a manner discussed below, which torsional locking preferably ensures that the friction surface 16a will remain between the friction ring 16 and the spring 29, as illustrated in FIG. 1a.

On the side defined by cover plate 7, the definition of the friction surface between the leg 14 of the guide element 13 and the hub disc 26 is clear.

In other words, according to FIG. 1a, on the side opposite the friction ring 16, that is, the side defined by cover plate 7, the friction surface 14a is preferably located between the leg 14 of the guide element 13 and the hub disc 26.

FIGS. 2 and 3 illustrate one embodiment of the friction ring 16. The friction ring 16 can preferably have a base body 18, which is preferably circular in shape and which can be installed in the clutch disc 1 concentrically with the axis of rotation 3. The base body 18, at at least two points distributed over the circumference, can preferably have axially-oriented first projections 20, the contours of which are designed so that they can be engaged in the tooth spaces of the toothing 6 of the hub 2 in the axial direction, and can preferably be tuned to one another so that there can preferably be no clearance in the circumferential direction. The inclusion of two axial projections 20 is advantageous because no pitch errors can occur in the circumferential direction which could interfere with the precise installation of the friction ring 16. These axial projections 20 of the friction ring 16 can also advantageously be conical in the axial direction, as shown in FIG. 4, so that during the installation of the friction ring 16, the friction ring 16 can be easily threaded into the toothing 6 of the hub 2. The circumferential size of these axial projections 20— shown as dimension X—can preferably be such that in the base region, i.e. in the vicinity of the transition from the projection 20 to the base body 18, as described more fully below, it can be essentially be guaranteed that there is preferably no clearance, or virtually no clearance, in relation to the tooth spaces of the toothing 6 of the hub 2. The circumferential contour of these axial projections 20 can be oriented to the contour of the tooth spaces of the toothing 6. The result is a low surface load on the circumference.

In other words, as illustrated by FIGS. 2 and 3, the first projections 20 are preferably designed to fit into the tooth spaces of the external toothing 6 of the hub 2, in the axial direction. The external toothing 6 of the hub 2, and the first projections 20 are preferably designed to interlock without any clearance or play in the circumferential direction, or possibly without any substantial clearance or play in the circumferential direction, or in the region between points 18a and 18b, in relation to the tooth spaces 6a of the hub 2, as illustrated in FIG. 4a. That is, points 18a and 18b will each preferably be in contact with a tooth surface of a tooth 6. The circumferential size of the first projections 20, shown in FIG. 4 as X, preferably ensures that the first projections 20 interlock with the external teeth 6 of the hub 2 without any, or without any substantial clearance or play in the circumferential direction, or between points 18a and 18b.

Figure 3A:
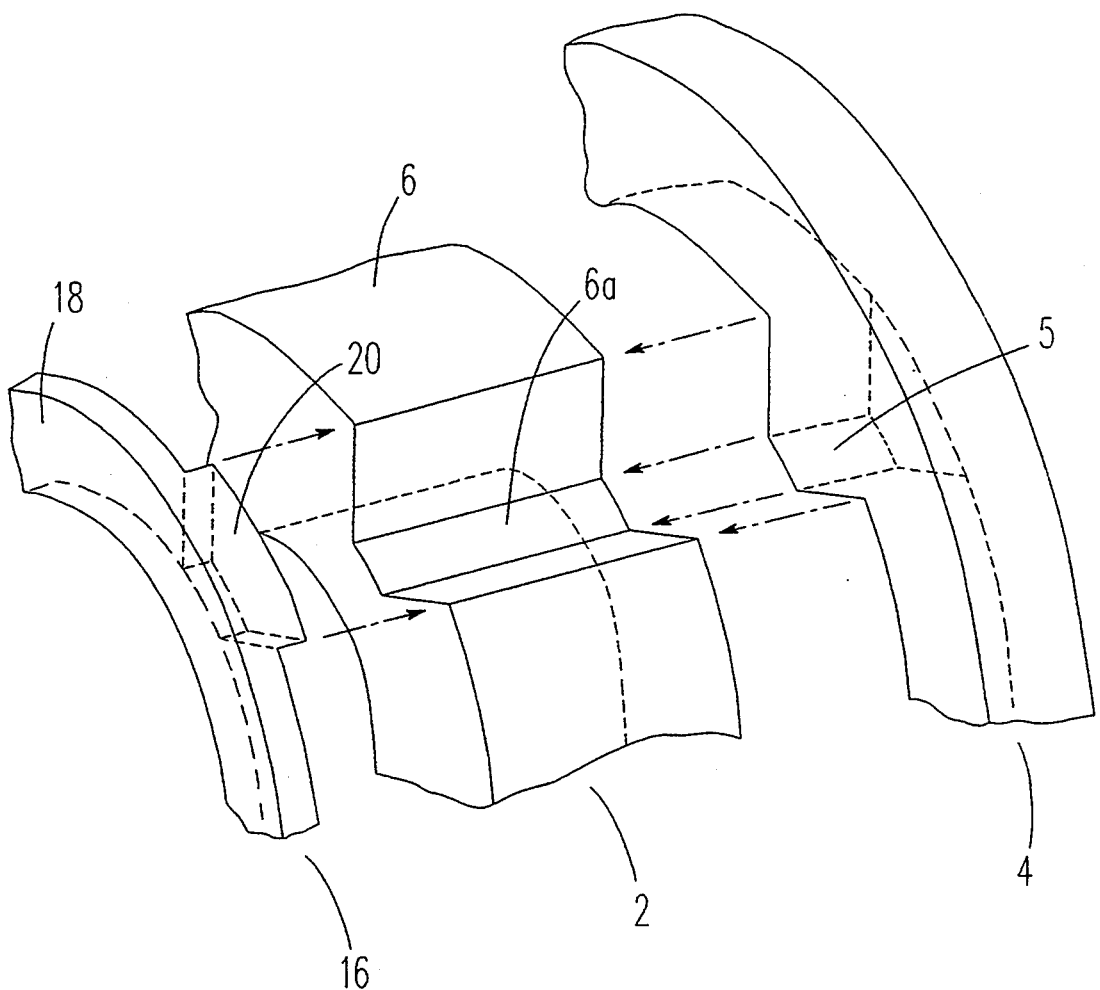
FIG. 3a shows a partial exploded view of a friction ring, hub, and hub disc.
Figure 4A:
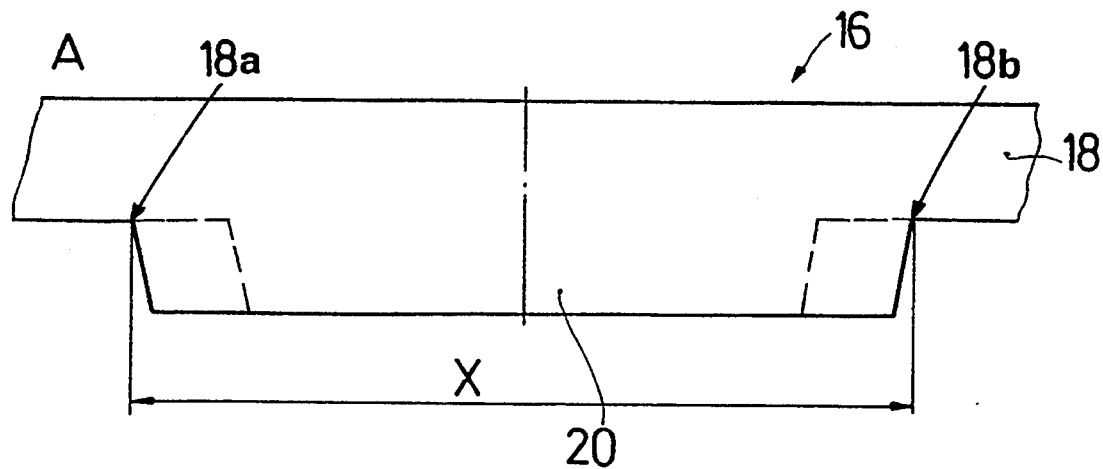
FIG. 4a is substantially the same view as FIG. 4 but shows additional components.

In addition, FIG. 3a shows an exploded view, in partial section, of the preferable engagement, or interlocking of the friction ring 16, hub 2, and the hub disc 4. As illustrated in FIG. 3a, at least one first axial projection 20 can preferably interlock with at least one tooth space 6a, which tooth space 6a is preferably located between and defined by two adjacent external teeth 6 of the hub 2. Further, at least one first axial projection 20 can preferably be disposed substantially tightly in the circumferential direction within a tooth space 6a. The internal teeth 5 of the hub disc 4 can also preferably interlock with the tooth spaces 6a located between and defined by two adjacent external teeth 6 of the hub 2. As shown in FIG. 3a, the first axial projection 20 and an internal tooth 5 preferably share the same tooth space 6a.

Figure 5A:
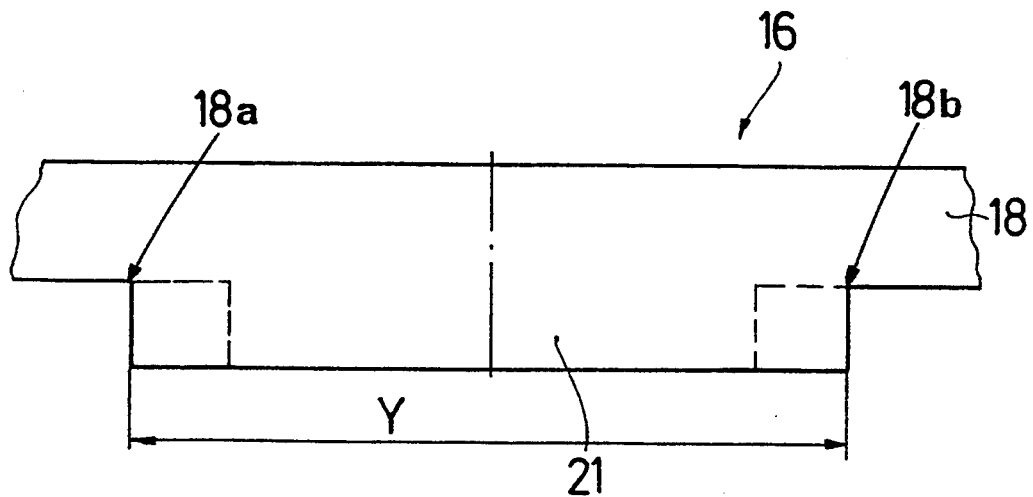
FIG. 5a is substantially the same view as FIG. 5 but shows additional components.

It is possible to have additional second axial projections 21 on the circumference of the friction ring 16. The number of these additional second axial projections 21 can range from a single second projection 21 up to the maximum number of second axial projections 21 needed to fill all of the teeth spaces 6a. These second axial projections 21 can preferably be designed as illustrated in FIG. 5, i.e. they are defined circumferentially by the dimension Y, which can preferably be smaller than the dimension X illustrated in FIG. 4. On one hand, this prevents pitch errors from causing problems during the installation of the friction ring 18, and on the other hand, it guarantees that if wear occurs to the first axial projections 20 in the circumferential direction, the additional axial projections 21 will still be able to transmit the force. Also, for production purposes, it is possible to keep the tolerances for the dimension Y of the projections 21 larger than for the projections 20, as illustrated in FIG. 4, thereby reducing manufacturing costs of such a friction ring 16.

In other words, should any wear occur to the first axial projections 20 in the circumferential direction or in the region between 18a and 18b, as illustrated in FIG. 4a, at least one of the additional axial projections 21 will still be able to transmit the force or torque.

In addition, according to FIG. 5, the second axial projections 21 can preferably be non-conical in shape in the axial direction, as opposed to the conical shape of the first axial projections 20, as shown in FIG. 4.

In another embodiment the second axial projections 21 may be tapered in a manner similar to first axial projections 20, to provide the required fit between the second axial projections 21 and the external toothing 6 of the hub 2.

Figure 6:
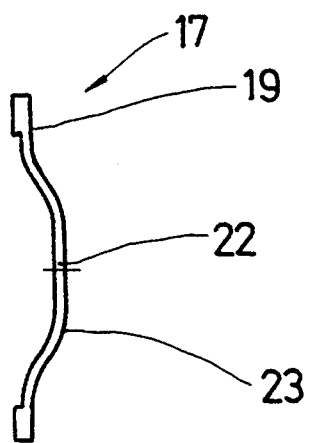
FIGS. 6 and 7 show a partial side view and plan view of an additional friction ring.
Figure 7:
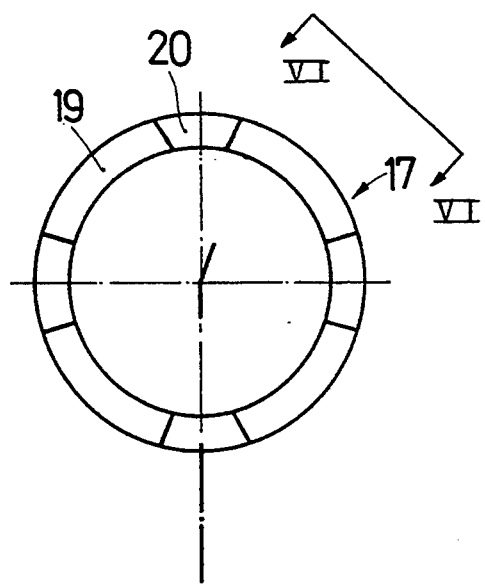

A variant embodiment of a friction ring is illustrated in FIGS. 6 and 7. The friction ring 17 used here, in terms of its axial projections 20, is the same as the friction ring 16 illustrated in FIGS. 2 to 4, but the base body 19 here is corrugated, or bent in the axial direction. In the circumferential areas which are located between the projections 20, the base body 19 can have corrugation crests which project toward the cover plate 8, which cover plate 8 is illustrated in FIG. 1. The corrugation crests 22 each preferably have a flat surface area 23. This presence of corrugation crests 22, and the resulting axial elastic action of the friction ring 17, provides the axial spring force necessary to position the friction ring 17. The friction ring 17 can preferably be installed in the axial direction between the ends of the toothing 6 and the cover plate 8 under an axial prestress, so that the spring 29 shown in FIG. 1 can be eliminated. Naturally, the second axial projections 21 added to the friction ring 16 can also be present with the friction ring 17. When the friction ring 17 is installed, the second axial projections 21 are then at least partly engaged in the toothing 6 under axial prestress.

One feature of the invention resides broadly in the clutch disc for a friction clutch in the drive train of a motor vehicle, consisting of a hub with a hub disc located concentrically with an axis of rotation, for torsionally locked installation on a drive shaft, cover plates on both sides of the hub disc which are torsionally locked to one another and held at a distance from one another, one of which supports the friction linings, windows in the hub disc and in the cover plates for the installation of spring actuators for relative torsional displacement when torque is applied, a radial guide between the one cover plate and the hub in the form of a guide element, which simultaneously represents an axial stop in relation to the hub, an external toothing pointing radially outward in the hub, with which the hub disc is engaged by means of an internal toothing, a basic friction device located on the side of the external toothing of the hub opposite the guide element with a friction ring which is oriented concentrically to the axis of rotation, and is in contact with the end surface of the external toothing running perpendicular to the axis of rotation and is subjected to the spring force exerted by the other cover plate, characterized by the fact that the friction ring 16, 17 has a base body 18, 19 from which at least two first axial projections 20 distributed over the circumference are engaged without clearance in those areas of the tooth spaces of the external toothing 6 of the hub 2 in the circumferential direction which are not occupied axially by the internal toothing 5 of the hub disc 4.

Another feature of the invention resides broadly in the clutch disc, characterized by the fact that the contour of the first projections 20 is essentially the same as the contour of the toothing 6.

Yet another feature of the invention resides broadly in the clutch disc, characterized by the fact that the first projections 20 preferably run conically in the axial direction, and in particular become smaller away from the base body 18, 19.

Still another feature of the invention resides broadly in the clutch disc, characterized by the fact that there are second axial projections 21 which are distributed over the circumference, and which have a smaller dimension Y than that of the tooth spaces of the external toothing 6.

Yet still another feature of the invention resides broadly in the clutch disc, characterized by the fact that the manufacturing tolerances of the second projections 21 can be larger, that is, the dimensions less precise, at least in the circumferential direction.

Another feature of the invention resides broadly in the clutch disc, characterized by the fact that the friction ring 17, in circumferential areas outside the first axial projections 20 with its base body 19 is corrugated axially toward the corresponding cover plate 8—to generate an axial prestress.

Still another feature of the invention resides broadly in the clutch disc, characterized by the fact that the base body 19, on the circumference, outside the projections 20, has corrugation crests 22, which run opposite to the projections 20 and have a flat surface 23.

Yet still another feature of the invention resides broadly in the clutch disc, whereby there is a clearance in the circumferential direction between the internal toothing of the hub disc and the external toothing of the hub, and there are spring actuators between the hub disc and the hub for an idle spring device, characterized by the fact that on the external toothing 6 of the hub 2, on one side, the hub disc 26 is rigidly fastened, the guide element 13 of the cover plate 7 corresponding to the hub disc 26 is in contact by means of an axially oriented leg 14 with the hub disc 26, there is an axially spring mounted friction ring 16 on the opposite side between the cover plate 8 and the end surface of the toothing 6, and the hub disc 4 is located between the friction ring 16 and the hub disc 26 of the idle spring device.

The present invention preferably eliminates fluctuations in the torsional loading of the clutch and engine assembly by the rotating transmission, which may be present in the prior art. These fluctuations in loading by the transmission may have a disruptive effect upon the adjustment of the idle during tuning of the engine in sensitive vehicles. The change in the loading originating in the transmission, which change in loading is then transmitted to the clutch assembly, will, at least, cause intermittent loading of the engine by the transmission, making it difficult to adjust the idle in sensitive vehicles.

Examples of friction clutches and friction clutch discs which may be utilized in accordance with the embodiments of the present invention may be found in the following United States Patents: U.S. Pat. No. 3,861,764, which issued to Adams on Jan. 21, 1975, entitled "Bearing Assembly and Bearing Bushing Therefor"; U.S. Pat. No. 4,433,771, which issued to Caray on Feb. 28, 1984, entitled "Torsion Damping Device for a Clutch Plate"; 4,453,838, which issued to Loizeau on Jun. 12, 1984, entitled U.S. Pat. No. "Torsion Damping Assembly and Radially Deformable Bearing Therefor"; 4,635,780, which issued to Wiggen on Jan. 13, 1987, entitled "Clutch Disc for a Motor Vehicle Friction Clutch"; U.S. Pat. No. 4,684,007, which issued to Maucher on Aug. 4, 1987, entitled "Clutch Plate"; 4,697,682, which issued to Alas et al. on Oct. 6, 1987, entitled "Torsional Damper Device"; U.S. Pat. No. 4,763,767, which issued to Lanzarini et al. on Aug. 16, 1988, entitled "Torsional Damper Device"; and 4,890,712, which issued to Maucher et al. on Jan. 2, 1990, entitled "Torsional Vibration Damping Device for Clutch Plates".

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The corresponding foreign patent publication applications, namely, Federal Republic of Germany Patent Application No. P 42 41 280.3, filed on Dec. 8, 1992, having inventors Norbert Ament and Harold Raab, and DE-OS P 42 41 280.3 and DE-PS P 42 41 280.3, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a transmission for a motor vehicle, said friction clutch comprising a clutch disc, said clutch disc comprising:
   a hub;
   said hub defining an axis of rotation;
   said hub comprising a hub disc disposed concentrically about said hub;
   said hub disc comprising a first side and a second side;
   a first cover plate disposed at said first side of said hub disc;
   said first cover plate comprising:
      a plurality of windows disposed within said first cover plate;
   a second cover plate disposed at said second side of said hub disc;
   said second cover plate comprising:
      a plurality of windows disposed within said second cover plate;
   said hub being configured to be torsionally locked on a drive shaft;
   said hub disc comprising:
      a plurality of windows disposed within said hub disc;
   ones of said plurality of windows of said first cover plate, said second cover plate, and said hub disc being aligned with one another;
   a plurality of spring actuators disposed within said ones of said plurality of windows of said first cover plate, said second cover plate, and said hub disc;
   friction linings;
   said friction linings being disposed on one of said first cover plate and said second cover plate;
   a guide element being disposed between said first cover plate and said hub to serve as an axial stop for positioning said first cover plate in relation to said hub;
   said hub comprising:
      a plurality of teeth extending radially outward from said hub;

a plurality of spaces being disposed between and defined by ones of said plurality of teeth of said hub; said hub disc comprising:

a plurality of teeth extending radially inward from said hub disc;

a plurality of spaces being disposed between and defined by ones of said plurality of teeth of said hub disc;

ones of said plurality of teeth of said hub disc being engaged between ones of said plurality of teeth of said hub in ones of said plurality of spaces between ones of said plurality of teeth of said hub;

friction means being disposed along said second cover plate;

said friction means for providing a friction surface adjacent said hub;

said friction means comprising:

a friction ring;

said friction ring disposed concentrically about said axis of rotation;

said friction ring comprising:

a ring-shaped base body;

said base body having an axial direction substantially parallel to said axis of rotation and a circumferential direction about said axis of rotation;

at least one first axial projection being disposed along said base body;

said at least one first axial projection substantially projecting in said axial direction;

said at least one first axial projection being disposed substantially tightly in the circumferential direction within one of said plurality of spaces between adjacent ones of said plurality of teeth of said hub;

spring means;

said spring means being disposed between said second cover plate and said friction ring; and said spring means being disposed to bias said friction ring towards said teeth of said hub.

2. The friction clutch according to claim 1 wherein:

said at least one first axial projection has first and second sides disposed at a substantial circumferential distance from one another;

said plurality of spaces of said hub have first and second sides disposed at a substantial circumferential distance from one another;

said first side of each said at least one first projection is in substantial contact with said first side of a corresponding one of said plurality of spaces of said hub; and said second side of each said at least one first projection is in substantial contact with said second side of a corresponding one of said plurality of spaces of said hub.

3. The friction clutch according to claim 2 wherein said first side of said at least one first projection is in direct interfacing contact with said first side of one of said plurality of spaces of said hub, and said second side of said at least one first projection is in direct interfacing contact with said second side of said one of said plurality of spaces of said hub.

4. The friction clutch according to claim 3 wherein said friction ring comprises at least two first axial projections spaced apart from one another along the circumferential direction of said base body.

5. The friction clutch according to claim 4 wherein:

said spaces between ones of said plurality of teeth of said hub each comprise a first portion and a second portion, said first portion and said second portion being disposed axially with respect to one another;

said at least two first axial projections are disposed within said first portion of corresponding ones of said spaces of said teeth of said hub in the circumferential direction; and ones of said plurality of teeth of said hub disc are disposed within said second portion of corresponding ones of said spaces of said teeth of said hub in the circumferential direction.

6. The friction clutch according to claim 5 wherein:

said at least two first axial projections comprise a contoured shape;

ones of said plurality of teeth of said hub comprise a contoured shape;

said contoured shape of said at least two first axial projections is substantially similar to said contoured shape of ones of said plurality of teeth of said hub;

said at least two first axial projections comprise a conical shape in an axial direction substantially parallel to said axis of rotation;

said at least two first axial projections become smaller in the axial direction away from said base body;

said friction ring comprises at least one second axial projection disposed on said base body and spaced apart from said at least two first axial projections;

said at least one second axial projection projects substantially in said axial direction;

said at least one second axial projection is configured to be and is disposed within one of said plurality of spaces of said hub, between two adjacent ones of said plurality of teeth of said hub;

said at least one second axial projection is disposed within one of said plurality of spaces of said hub, and not as substantially tight as said at least two first axial projections disposed within said ones of said plurality of spaces of teeth of said hub;

said friction means comprises corrugation crests of said base body of said friction ring;

said corrugation crests is disposed between adjacent ones of said at least two first axial projections and said at least one second axial projection;

said corrugation crests project in an axial direction opposite to said axial direction of said at least two first axial projections and said at least one second axial projection to to generate an axial prestress;

said corrugation crests comprise:

first portions adjacent to said at least two first axial projections and said at least one second axial projection;

a second portion disposed between said first portions;

said first portions are disposed angularly with respect to said at least two first axial projections and said at least one second axial projection;

said second portion comprises flat portions between said first portions;

said at least two first axial projections are disposed diametrically opposite one another along said base body;

said base body comprises:

an inner area and an outer area;

each of said at least two first axial projections comprise an inside surface and an outside surface;

said inside surface is disposed along said inner area of said base body;

said outside surface is disposed along said outer area of said base body;

said inner surface comprises 1/16 of the circumference of said inner area;

said outer surface comprises 1/11 of the circumference of said outer area;

said clutch disc comprises:
  an idle spring device disposed opposite said friction means;

said idle spring device comprises:
  two additional cover plates;
  an additional hub disc disposed between said additional two cover plates;
  a plurality of windows disposed within said two additional cover plates and said additional hub disc;
  said ones of said plurality of windows of said two additional cover plates and said additional hub disc are aligned with one another;
  a plurality of springs disposed within said ones of said windows of said two additional cover plates and said additional hub disc;

a basic friction device disposed adjacent said friction means;

a guide element and an axially oriented guide leg disposed opposite said friction means;

said guide leg is disposed in contact with said additional hub disc to provide a connection between said guide element and said additional hub disc;

said additional hub disc is rigidly connected to said hub;

said two additional cover plates are configured to be torsionally locked to said hub disc; and said plurality of teeth of said hub disc are engaged between ones of said plurality of teeth of said hub within ones of said plurality of spaces between ones of said plurality of teeth of said hub with some clearance in the circumferential direction.

7. In a transmission for a motor vehicle, a friction clutch, said friction clutch comprising a clutch disc, said clutch disc comprising:
  a hub;
  said hub defining an axis of rotation;
  said hub comprising a hub disc disposed concentrically about said hub;
  said hub disc comprising a first side and a second side;
  a first cover plate disposed at said first side of said hub disc;
  said first cover plate comprising:
    a plurality of windows disposed within said first cover plate;
  a second cover plate disposed at said second side of said hub disc;
  said second cover plate comprising:
    a plurality of windows disposed within said second cover plate;
  said hub being configured to be torsionally locked on a drive shaft;
  said hub disc comprising:
    a plurality of windows disposed within said hub disc;
  ones of said plurality of windows of said first cover plate, said second cover plate, and said hub disc being aligned with one another;
  a plurality of spring actuators disposed within said ones of said plurality of windows of said first cover plate, said second cover plate, and said hub disc;
  friction linings;
  said friction linings being disposed on one of said first cover plate and said second cover plate;
  a guide element being disposed between said first cover plate and said hub to serve as an axial stop for positioning said first cover plate in relation to said hub;
  said hub comprising:
    a plurality of teeth extending radially outward from said hub;
    a plurality of spaces being disposed between and defined by ones of said plurality of teeth of said hub;
  said hub disc comprising:
    a plurality of teeth extending radially inward from said hub disc;
    a plurality of spaces being disposed between and defined by ones of said plurality of teeth of said hub disc;
    ones of said plurality of teeth of said hub disc being engaged between ones of said plurality of teeth of said hub in ones of said plurality of spaces between ones of said plurality of teeth of said hub;
  friction means being disposed along said second cover plate;
  said friction means for providing a friction surface adjacent said hub;
  said friction means comprising:
    a friction ring;
    said friction ring disposed concentrically about said axis of rotation;
    said friction ring comprising:
      a ring-shaped base body;
      said base body having an axial direction substantially parallel to said axis of rotation and a circumferential direction about said axis of rotation;
      at least one first axial projection being disposed along said base body;
      said at least one first axial projection substantially projecting in said axial direction;
      said at least one first axial projection being disposed substantially tightly in the circumferential direction within one of said plurality of spaces between adjacent ones of said plurality of teeth of said hub;
    spring means;
    said spring means being disposed between said second cover plate and said friction ring; and
    said spring means being disposed to bias said friction ring towards said teeth of said hub.

8. The friction clutch according to claim 7 wherein said at least one first axial projection is disposed tightly, with respect to the circumferential direction, within one of said plurality of spaces between adjacent ones of said plurality of teeth of said hub.

9. The friction clutch according to claim 8 wherein:
  said friction ring comprises at least two first axial projections spaced apart from one another along the circumferential direction of said base body;
  said spaces between ones of said plurality of teeth of said hub each comprise a first portion and a second portion, said first portion and said second portion being disposed axially with respect to one another;

said at least two first axial projections are disposed within said first portion of corresponding ones of said spaces of said teeth of said hub in the circumferential direction; and ones of said plurality of teeth of said hub disc are disposed within said second portion of corresponding ones of said spaces of said teeth of said hub in the circumferential direction.

10. The friction clutch according to claim 9 wherein:

said at least two first axial projections comprise a contoured shape;

ones of said plurality of teeth of said hub comprise a contoured shape;

said contoured shape of said at least two first axial projections is substantially similar to said contoured shape of ones of said plurality of teeth of said hub;

said at least two first axial projections comprise a conical shape in an axial direction substantially parallel to said axis of rotation;

said at least two first axial projections become smaller in the axial direction away from said base body;

said friction ring comprises at least one second axial projection disposed on said base body and spaced apart from said at least two first axial projections;

said at least one second axial projection projects substantially in said axial direction;

said at least one second axial projection is configured to be and is disposed within one of said plurality of spaces of said hub, between two adjacent ones of said plurality of teeth of said hub;

said at least one second axial projection is disposed within said one of said plurality of spaces of said hub, and not as substantially tight as said at least two first axial projections disposed within said ones of said plurality of spaces of teeth of said hub;

said friction means comprises corrugation crests of said base body of said friction ring;

said corrugation crests are disposed between adjacent ones of said at least two first axial projections and said at least one second axial projection;

said corrugation crests project in an axial direction opposite to said axial direction of said at least two first axial projections and said at least one second axial projection to generate an axial prestress;

said corrugation crests comprise:

first portions adjacent to said at least two first axial projections and said at least one second axial projection;

a second portion disposed between said first portions;

said first portions are disposed angularly with respect to said at least two first axial projections and said at least one second axial projection;

said second portion comprises flat portions between said first portions;

said at least two first axial projections are disposed diametrically opposite one another along said base body;

said base body comprises:

an inner area and an outer area;

each of said at least two first axial projections comprise an inside surface and an outside surface;

said inside surface is disposed along said inner area of said base body;

said outside surface is disposed along said outer area of said base body;

said inner surface comprises 1/16 of the circumference of said inner area;

said outer surface comprises 1/11 of the circumference of said outer area;

said clutch disc comprises:

an idle spring device disposed opposite said friction means;

said idle spring device comprises:

two additional cover plates;

an additional hub disc disposed between said additional two cover plates;

a plurality of windows disposed within said two additional cover plates and said additional hub disc;

said ones of said plurality of windows of said two additional cover plates and said additional hub disc are aligned with one another;

a plurality of springs disposed within said ones of said windows of said two additional cover plates and said additional hub disc;

a basic friction device disposed adjacent said friction means;

a guide element and an axially oriented guide leg disposed opposite said friction means;

said guide leg is disposed to be contact with said additional hub disc to provide a connection between said guide element and said additional hub disc;

said additional hub disc is rigidly connected to said hub;

said two additional cover plates are configured to be torsionally locked to said hub disc; and said plurality of teeth of said hub disc being engaged between ones of said plurality of teeth of said hub within ones of said plurality of spaces between ones of said plurality of teeth of said hub with some clearance in the circumferential direction.

11. A clutch disc for a friction clutch, said clutch disc comprising:

a hub;

said hub defining an axis of rotation;

said hub comprising:

a plurality of teeth extending radially outward from said hub;

a plurality of spaces disposed between and defined by ones of said plurality of teeth of said hub;

a hub disc;

said hub disc disposed about said hub concentrically;

said hub disc comprising:

a plurality of teeth extending radially inward from said hub disc;

ones of said plurality of teeth of said hub disc being engaged between ones of said plurality of teeth of said hub in ones of said plurality of spaces between ones of said plurality of teeth of said hub;

friction means;

said friction means for providing a friction surface adjacent said hub;

said friction means comprising:

a friction ring disposed concentrically about said axis of rotation;

said friction ring comprising:

a ring-shaped base body;

said base body having an axial direction substantially parallel to said axis of rotation and a circumferential direction about said axis of rotation;

at least one first axial projection disposed along said base body and substantially projecting in said axial direction; and said at least one first axial projection configured to be and being disposed substantially tightly in the circumferential direction within one of said spaces between adjacent ones of said plurality of teeth of said hub.

12. The clutch disc according to claim 11 wherein:

said at least one first axial projection has first and second sides disposed at a substantial circumferential distance from one another;

said plurality of spaces of said hub have first and second sides disposed at a substantial circumferential distance from one another;

said first side of said at least one first projection is in direct interfacing contact with said first side of one of said plurality of spaces of said hub, and said second side of said at least one first projection is direct interfacing contact with said second side of said one of said plurality of spaces of said hub; and said at least one first axial projection is disposed tightly in the circumferential direction within one of said plurality of spaces between adjacent ones of said plurality of teeth of said hub.

13. The clutch disc according to claim 12 wherein said friction ring comprises at least two first axial projections spaced apart from one another along the circumferential direction of said base body.

14. The clutch disc according to claim 13 wherein:

said spaces between ones of said plurality of teeth of said hub each comprise a first portion and a second portion, said first portion and said second portion being disposed axially with respect to one another;

said at least two first axial projections are disposed within said first portion of corresponding ones of said spaces of said teeth of said hub in the circumferential direction;

ones of said plurality of teeth of said hub disc are disposed within said second portion of corresponding ones of said spaces of said teeth of said hub in the circumferential direction.

15. The clutch disc according to claim 14 wherein said clutch disc comprises:

spring means disposed adjacent to said friction ring to bias said friction ring towards said plurality of teeth of said hub and to hold said friction ring in engagement with said plurality of teeth of said hub.

16. The clutch disc according to claim 15 wherein:

said at least two first axial projections comprise a contoured shape;

ones of said plurality of teeth of said hub comprise a contoured shape; and said contoured shape of said at least two first axial projections is substantially similar to said contoured shape of ones of said plurality of teeth of said hub.

17. The clutch disc according to claim 16 wherein said at least two first axial projections comprise:

a conical shape in an axial direction substantially parallel to said axis of rotation; and said at least two first axial projections become smaller in the axial direction away from said base body.

18. The clutch disc according to claim 17 wherein said friction ring comprises:

at least one second axial projection disposed on said base body and spaced apart from said at least two first axial projections;

said at least one second axial projection substantially projecting in said axial direction;

said at least one second axial projection is configured to be and is disposed within one of said plurality of spaces of said hub, between two adjacent ones of said plurality of teeth of said hub; and said at least one second axial projection being disposed within said one of said plurality of spaces of said hub, and not as substantially tight as said at least two first axial projections disposed within said ones of said plurality of spaces of teeth of said hub.

19. The clutch disc according to claim 18 wherein said friction means comprises:

corrugation crests of said base body of said friction ring;

said corrugation crests are disposed between adjacent ones of said at least two first axial projections and said at least one second axial projection;

said corrugation crests project in an axial direction opposite to said axial direction of said at least two first axial projections and said at least one second axial projection to generate an axial prestress;

said corrugation crests comprise:

first portions adjacent to said at least two first axial projections and said at least one second axial projection;

a second portion disposed between said first portions;

said first portions are disposed angularly with respect to said at least two first axial projections and said at least one second axial projection; and said second portion comprises flat portions between said first portions.

20. The clutch disc according to claim 19 wherein:

said at least two first axial projections are disposed diametrically opposite one another along said base body;

said base body comprises:

an inner area and an outer area;

each of said at least two first axial projections comprise an inside surface and an outside surface;

said inside surface is disposed along said inner area of said base body;

said outside surface is disposed along said outer area of said base body;

said inner surface comprises 1/16 of the circumference of said inner area;

said outer surface comprises 1/11 of the circumference of said outer area;

said clutch disc comprises:

an idle spring device disposed opposite said friction means;

said idle spring device comprises:

two additional cover plates;

an additional hub disc disposed between said additional two cover plates;

a plurality of windows disposed within said two additional cover plates and said additional hub disc;

said ones of said plurality of windows of said two additional cover plates and said additional hub disc being aligned with one another;

a plurality of springs disposed within said ones of said windows of said two additional cover plates and said additional hub disc;

a basic friction device disposed adjacent said friction means;

a guide element and an axially oriented guide leg disposed opposite said friction means;

said guide leg is disposed in contact with said additional hub disc to provide a connection between said guide element and said additional hub disc;

said additional hub disc is rigidly connected to said hub;

said two additional cover plates being configured to be torsionally locked to said hub disc; and said plurality of teeth of said hub disc being engaged between ones of said plurality of teeth of said hub within ones of said plurality of spaces between ones of said plurality of teeth of said hub with some clearance in the circumferential direction.

* * * * *